United States Patent [19]

Koyama et al.

[11] Patent Number: 5,207,979
[45] Date of Patent: May 4, 1993

[54] NUCLEAR FUEL ASSEMBLIES AND REACTOR CORES INCLUDING THEM

[75] Inventors: Junichi Koyama, Hitachi; Motoo Aoyama, Mito; Akinobu Nakajima, Hitachi; Yasunori Bessho, Mito; Junichi Yamashita, Hitachi; Sadao Uchikawa; Hiromi Maruyama, both of Katsuta; Michihiro Ozawa; Mitsunari Nakamura, both of Hitachi, all of Japan

[73] Assignee: Hitachi, Ltd., Tokyo, Japan

[21] Appl. No.: 496,309

[22] Filed: Mar. 20, 1990

Related U.S. Application Data

[63] Continuation-in-part of Ser. No. 268,595, Nov. 7, 1988, Pat. No. 5,008,070.

[30] Foreign Application Priority Data

Nov. 7, 1987 [JP] Japan .................................. 62-281639
Jun. 24, 1988 [JP] Japan .................................. 63-154746
Mar. 20, 1989 [JP] Japan .................................. 1-66224

[51] Int. Cl.$^5$ .............................................. G21C 3/00
[52] U.S. Cl. ...................................... 376/419; 376/447
[58] Field of Search ............. 376/419, 435, 447, 212

[56] References Cited

U.S. PATENT DOCUMENTS

| | | | |
|---|---|---|---|
| 3,799,839 | 3/1974 | Fischer et al. | 376/419 |
| 4,324,615 | 4/1982 | Kobayashi et al. | 376/267 |
| 4,324,615 | 4/1982 | Kobayashi et al. | 376/267 |
| 4,629,599 | 12/1986 | Crowther et al. | 376/419 |
| 4,789,520 | 12/1988 | Morimoto et al. | 376/419 |

*Primary Examiner*—Donald P. Walsh
*Assistant Examiner*—Meena Chelliah
*Attorney, Agent, or Firm*—Antonelli, Terry, Stout & Kraus

[57] ABSTRACT

A nuclear fuel assembly has an array of fuel rods comprising a plurality of first fuel rods each containing nuclear fuel material but not containing burnable poison and a plurality of further fuel rods each containing both nuclear fuel material and burnable poison. The further fuel rods comprise second fuel rods and third fuel rods, and each second fuel rod has at a lower region of the fuel assembly a burnable poison concentration which is a minimum burnable poison concentration in the further fuel rods. To increase the effectiveness of the second fuel rods in controlling axial power peaking, as seen in plan view on the array, the first fuel rods are the nearest neighbors of each further fuel rod.

11 Claims, 12 Drawing Sheets

NUCLEAR FUEL ASSEMBLIES AND REACTOR CORES INCLUDING THEM

This invention is a continuation-in-part of U.S. Pat. No. 5,008,070 issued on Apr. 16, 1991 the subject matter thereof being incorporated by reference.

BACKGROUND OF THE INVENTION

1. Field of the Invention

This invention relates to a nuclear fuel assembly and to the core of a reactor and, more particularly, to a fuel assembly and to a reactor core of a boiling water reactor.

2. Description of the Prior Art

The fuel assembly used in a boiling water reactor typically includes fuel rods, water rods and upper and lower tie plates for supporting the upper and lower end portions of the fuel rods and water rods. The water rods are disposed among the fuel rods. The fuel rods comprise fuel rods containing a burnable poison (such as gadolinia ($Gd_2O_3$)) and fuel rods not containing it.

In a boiling water reactor, because the void fraction (ratio of steam volume to total volume) varies over the core height, the power distribution in the axial direction of the core is low at an upper portion and high at a lower portion. Therefore, a burnable poison is used not only to restrict an excessive reaction rate but also to control the power distribution in the axial direction of the core. Examples of such use of a burnable poison are represented by the fuel assemblies shown in FIGS. 2A and 2B and FIGS. 3A and 3B of U.S. Pat. No. 4,587,090. The first of these includes fuel rods whose gadolinia concentration (4.5 wt %) in the axial direction is uniform and fuel rods which are divided into the upper and lower regions at the position of 11/24 from the lower end of their effective fuel length and whose gadolinia concentration is higher in the lower region (4.5 wt %) than in the upper region (3.5 wt %). The second of these fuel assemblies includes fuel rods of the latter, divided type and fuel rods which contain gadolinia (4.5 wt %) in the upper region and do not contain any gadolinia in the lower region.

Furthermore, the fuel assembly shown in FIG. 1 of Japanese Laid-Open Patent Specification No. 149588/1988 includes two kinds of fuel rods containing burnable poison. These fuel rods comprise fuel rods having a low gadolinia concentration and fuel rods having a high gadolinia concentration. In each gadolinia-containing fuel rod, gadolinia is distributed uniformly in the axial direction. These fuel rods, including those which do not contain gadolinia, are disposed in a rectangular array. In other words, each fuel rod is positioned at the point of intersection of a rectangular grid. In such a structure, the fuel rods having a low gadolinia concentration and the fuel rods having a high gadolinia concentration are disposed adjacent to one another in the rows and columns of the array, which are parallel to the side surfaces of the lower tie plate (i.e. in an X direction or in a Y direction orthogonal to the X direction).

Mention is also made of Japanese Laid-Open Patent Specification No. 217186/1987 referred to below.

In the boiling water reactor having in its core the fuel assembly shown in FIG. 2A (using the fule rods shown in FIG. 2B) or the fuel assembly shown in its FIG. 3A (using the fuel rods shown in FIG. 3B) of U.S. Pat. No. 4,587,090, the axial power peaking is high at the initial stage of an operation cycle. Axial power peaking describes the peak value of power at one axial location of the core, i.e. deviation from a uniform power distribution. Particularly when the latter fuel assembly (FIGS. 3A and 3B), in which the number of gadolinia-containing fuel rods is smaller in the lower region than in the upper region, is employed, the axial power peaking is very high at the initial stage of the operation cycle. The operation of the core is conducted at a high average void fraction with axially skewed power distribution in the first half of the operation cycle, and the average void fraction becomes low since the power of the lower region, where burn-up has proceeded, becomes low at the final stage of the operation cycle. A spectral shift effect occurs by changing in this manner the average void fraction during the operation cycle.

In the fuel assembly described in Japanese Laid-Open Patent Specification No. 149588/1988 with fuel rods having a low gadolinia concentration and fuel rods having a high gadolinia concentration, the gadolinia concentration of the former is below 60% of that of the latter. As a result of studies, the present inventors have found that in such a fuel assembly, the axial power peaking at the initial stage of the operation cycle (0 to about 2 GWd/st) reduces more than in the two fuel assemblies disclosed in U.S. Pat. No. 4,587,090.

SUMMARY OF THE INVENTION

However, in order further to improve characteristics such as a linear heat generation rate and thermal hydraulic stability, it is desired to reduce the axial power peaking at the initial stage of the operation cycle.

It is an object of the present invention to provide a fuel assembly which can reduce the axial power peaking at the initial stage of the operation cycle.

In the fuel assembly of the invention, the fuel rods containing the burnable poison include (a) at least one fuel rod which has the minimum burnable poison concentration inside the fuel assembly at a lower region and (b) other fuel rods. Fuel rods not containing the burnable poison are disposed between the fuel rods containing burnable poison.

Since the fuel rods having the minimum burnable poison concentration in the lower region are disposed spaced-apart from the other fuel rods containing burnable poison, reactivity in the lowest region is efficiently reduced by the rods having burnable poison of the minimum concentration and thus the axial power peaking at the initial stage of the operation cycle can be reduced effectively.

BRIEF INTRODUCTION OF THE DRAWINGS

Embodiments of the invention given as non-limitative examples, and other explanatory examples, will now be described with reference to the accompanying drawings, in which.

DESCRIPTION OF THE PREFERRED EMBODIMENTS

The present invention is discussed below on the basis of detailed examination of the properties of burnable poisons such as gadolinia. The result of such studies will be explained next. As well as gadolinium, other usable burnable poisons are hafnium, samarium, cadmium and europium.

Burn-up dependency of core average axial power peaking in the first half of the operation cycle results primarily from the following two factors.

Generally, several groups of fuel assemblies having different amounts of nuclear fission products and different amounts of burnable poisons exist together in the core. In a core which has experienced several cycles of operation, grouping of the fuel assemblies can be made by the number of operation cycles in which they stay inside the core. Hereinafter, the group of fuel assemblies having the greatest amount of nuclear fission products and the greatest amount of burnable poisons will be referred to as the "first group" and those groups of fuel assemblies which hardly contain the burnable poisons are put in order in accordance with the amount of the nuclear fission products contained therein and will be referred to as the "second and third groups", and so forth. Immediately before the start of operation of a certain operation cycle (after reloading of the fuel), the fuel assemblies of the first group are generally fresh fuel assemblies (exposure of 0 GWd/st) which have not yet experienced operation. The fuel assemblies of the second group have experienced one operation cycle and those of the third group two operation cycles.

Figure 9:
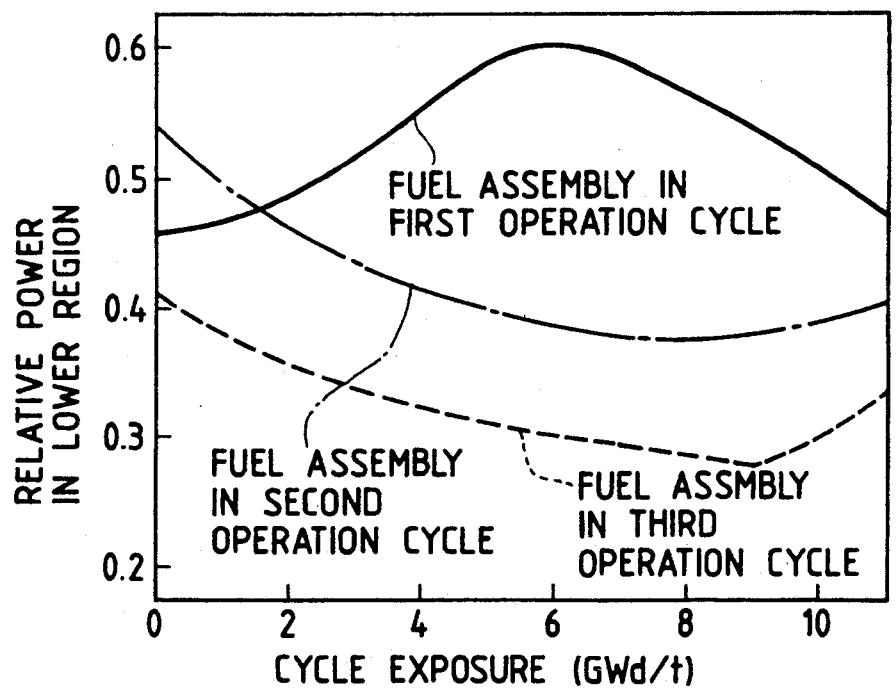
FIG. 9 is a graph showing the change of relative power in the lower region of several groups of fuel assemblies.
Figure 10:
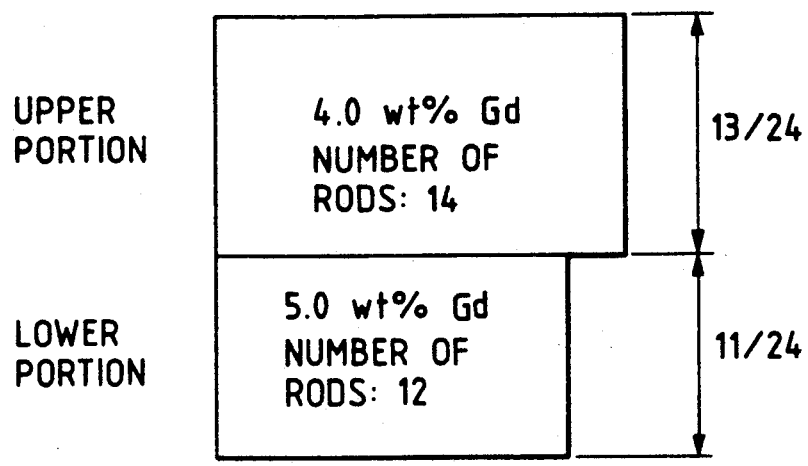
FIG. 10 is a diagram of the gadolinia distribution of the rods of the fuel assembly which is conceived for assisting the understanding of characterizing features of the present invention.
Figure 11:
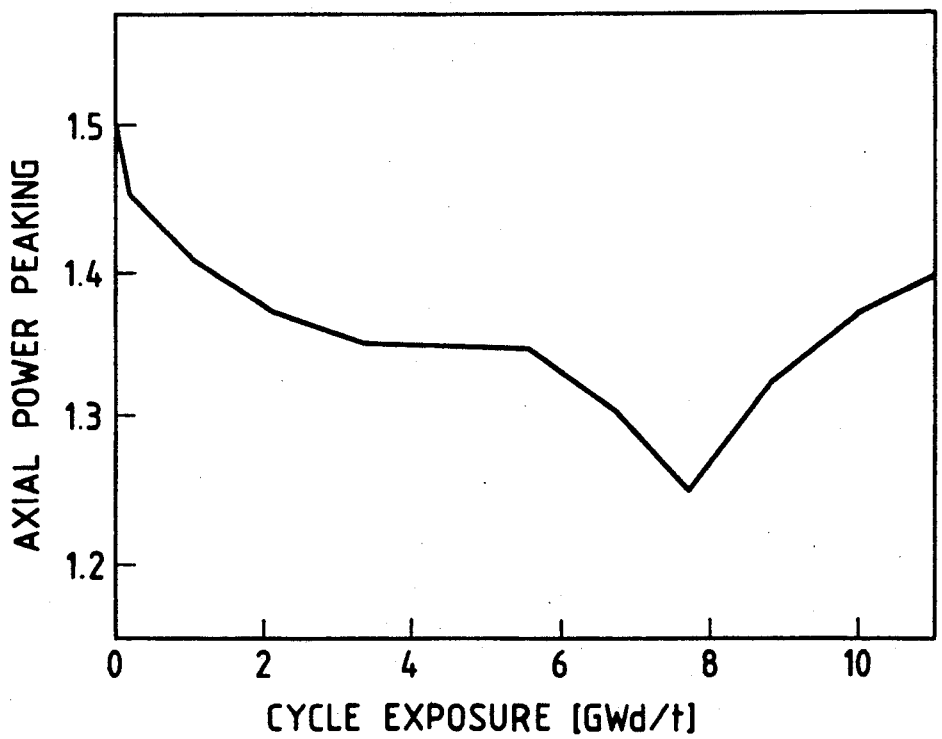
FIG. 11 is a graph showing the change of the axial power peaking with exposure for the fuel assembly shown in FIG. 10.

In a boiling water reactor, in which there are loaded fresh fuel assemblies having fuel rods of axial gadolinia distribution and number distribution shown in FIG. 10, FIG. 9 shows how the contribution of the fuel assemblies of each group to the relative power of the lower part of the core changes with burn-up. The solid line represents the characteristics of the fuel assemblies of the first group, one-dot-chain line represents those of the fuel assemblies of the second group and the dash line those of the fuel assemblies of the third group. FIG. 11 shows the change of the axial power peaking for the fuel assembly containing the gadolinia-containing fuel rods shown in FIG. 10. The axial power peaking is high at the initial stage of the operation cycle.

Figure 1:
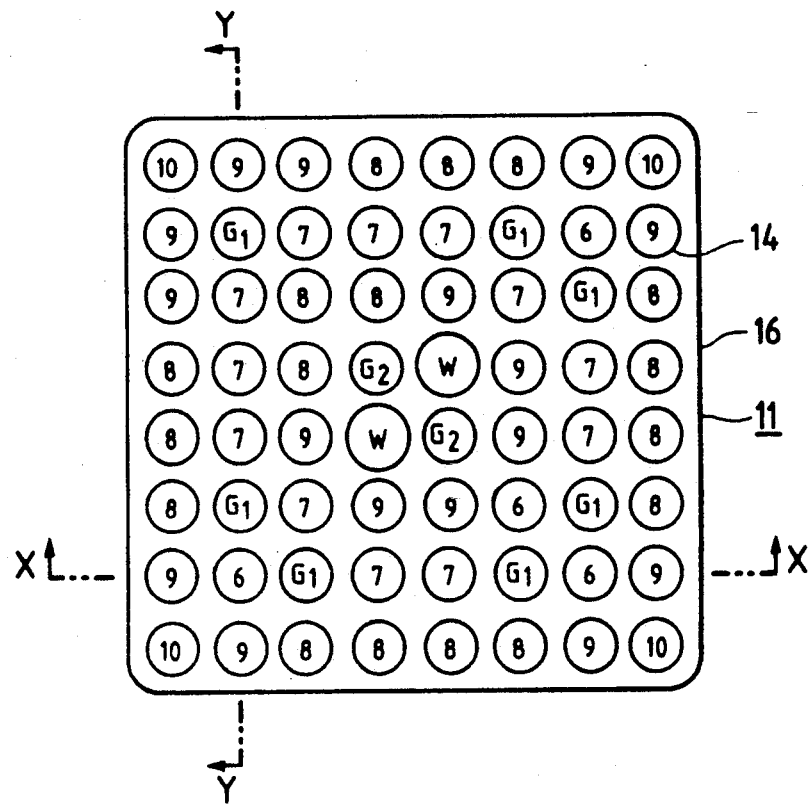
FIG. 1 is a diagrammatic transverse sectional view showing a first fuel assembly embodying the present invention and can be understood as a sectional view taken along line I—I of FIG. 3.
Figure 2:
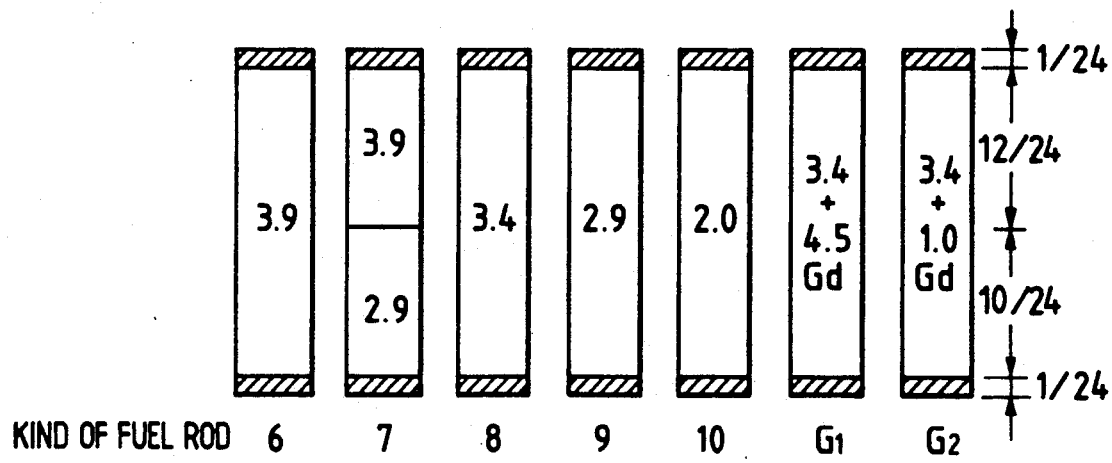
FIG. 2 is a diagram showing enrichment and gadolinia concentration distribution of each fuel rod shown in FIG. 1.

The fuel assembly having the gadolinia-containing fuel rods shown in FIG. 10 is not a prior art example but is conceived by the inventors of the present invention in order to make it easier to understand application of the concept shown in FIGS. 1 and 2 of U.S. Pat. No. 5,008,070. In the core of a boiling water reactor, the effective H/U (hydrogen-to-uranium ratio) is different between the upper and lower portions of the core in the axial direction during operation. This arises because the void fraction changes over the height of the core. Since H/U is large and the neutron energy spectrum is soft at the lower portion of the core, the change of the neutron infinite multiplication factor with burn-up is steeper in the lower portion of the core (represented by the solid line in FIG. 12) than in the upper portion (represented by dash line in FIG. 12). In the fuel assembly of the first group (defined above), the neutron infinite multiplication factor increases as the gadolinia burns and since the increase is steeper in the lower region than in the upper region, the relative power in the lower region becomes gradually higher. After the gadolinia in the lower region has burnt up more rapidly, the neutron infinite multiplication factor starts dropping with burn-up of the nuclear fission materials. Accordingly, the relative power of the lower region starts dropping at this time. On the other hand, since the fuel assemblies of the second and third groups have previously experienced operation and do not contain gadolinia, their neutron infinite multiplication factor decreases monotonously. In the fuel assemblies of the second and third groups, too, the rate of decrease of the neutron infinite multiplication factor is higher in the lower region having large H/U and the relative power of the lower region drops gradually. The relative output of the lower region shown in FIG. 9 is determined by how much the reactivity is higher in the lower region of the fuel assembly of each group than in the upper region and how much the fuel assemblies of each group share the power in the core as a whole.

The reason why the axial power peaking drops rapidly in the lower region of the core at the initial stage of the operation cycle is the rapid drop of the relative power in the lower region of the fuel assembly of the second group having the highest reaction rate at this stage. The first factor that causes the change of the axial power peaking with respect to the exposure is that a difference occurs in the changes of the neutron infinite multiplication factor in the upper and lower regions of the core due to the variation of H/U with the axial location in the core, and that the power sharing between the fuel assemblies of each group changes with burn-up inside the core.

The change of the relative power in the lower region for each of the fuel assemblies of the second and third groups forms generally a concave curve. The relative power p of the lower region is the product of the power sharing ratio s of the fuel assembly of each group and the power peaking r in the axial direction in the lower region when normalized for each group. The power peaking r in the axial direction is a decreasing function of core exposure E when the axial power distribution is not extremely upwardly skewed.

The power sharing ratio s in the decreasing function of the core exposure E in the second and third groups. Assuming that the axial power peaking r and the power sharing ratio s decrease linearly:

$$r = -a.E + b \quad (1)$$

$$s = -c.E + d \quad (2)$$

(where a, b, c and d are constants, and $a > 0$, $c > 0$). The following relation can then be derived:

$$p = r.s = ac.E_2 - (ad + bc)E + b.d \quad (3)$$

Therefore, it is a general phenomenon that in the fuel assemblies of the second and third groups, the exposure dependency curve of the relative power in the lower region is concave.

Figure 12:
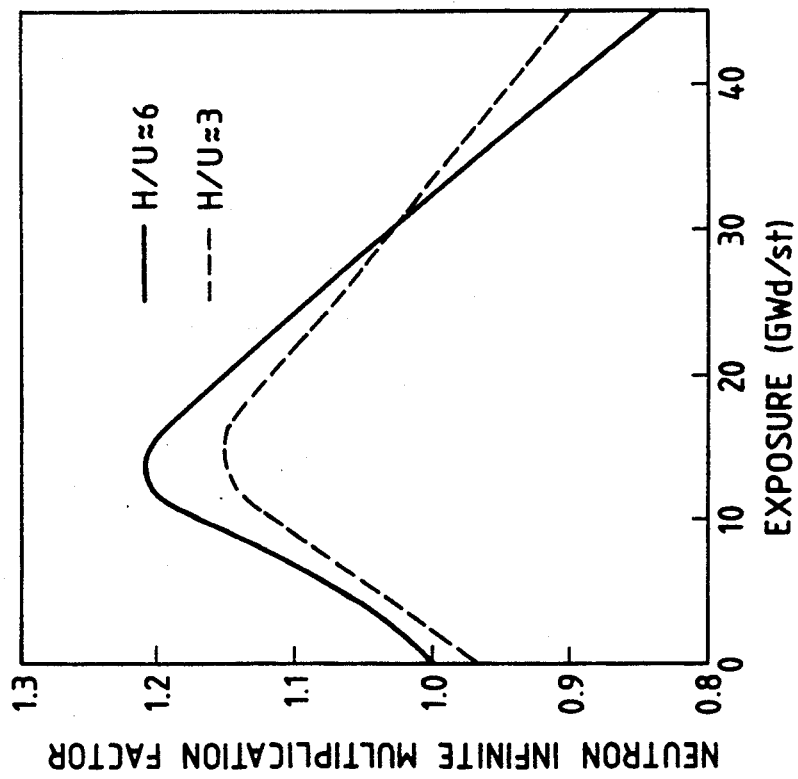
FIG. 12 is a graph showing the change of the neutron infinite muliplication factor with exposure, using H/U as a parameter.

In comparison with the characteristics described above, if the relative power in the lower region of the fuel assembly of the first group is sufficiently small and forms a convex curve at the initial stage of the operation cycle, the axial power peaking in the lower region can be kept constant in the core as a whole. In the conventional fuel assembly, however, the fuel assembly of the first group, too, shows a concave-shaped curve of relative power on the lower region at the initial stage of the operation cycle as shown in FIG. 9. This is because when H/U is large, the curve of the neutron infinite multiplication factor becomes concave in the lower region at the initial stage of the operation cycle as shown in FIG. 12. Incidentally, the curve of the neutron infinite multiplication factor for the upper region having H/U as small as 3 is almost linear at the initial stage of the operation cycle.

Figure 13:
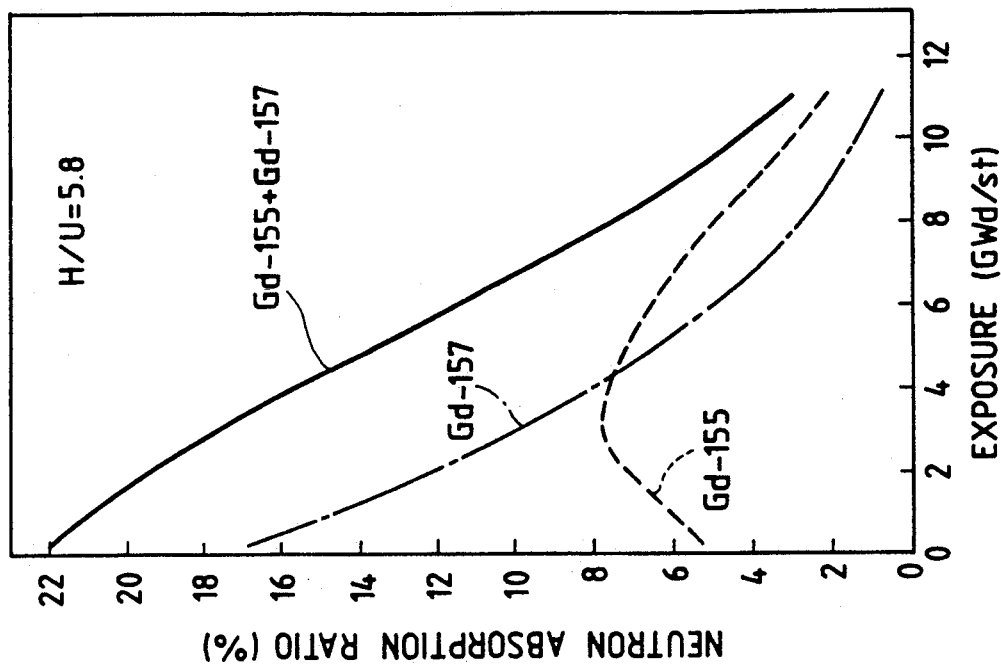
FIGS. 13 and 14 are graphs showing the change of neutron absorption ratio of Gd-155 and Gd-157 with exposure.

FIG. 13 shows the change of the neutron absorption ratio of gadolinia with respect to the exposure separately for Gd-155 and Gd-157 which have large neutron absorption cross sections. Natural gadolinium contains substantially equal amounts of Gd-155 and Gd-157. The microscopic absorption cross section of Gd-157 for thermal neutrons is at least four times that of Gd-155. Therefore, the major proportion of the thermal neutrons are absorbed by Gd-157. There is thus an effect as if Gd-155 were shielded from neutrons by Gd-157. Neutron absorption by Gd-155 increases gradually with the decrease of Gd-157. After the neutron absorption rate of Gd-155 reaches almost the same level as that of Gd-157, both Gd-155 and Gb-157 decrease. Therefore, the neutron absorption curve as the sum of the effects of Gd-155 and Gd-157 is convex at first and concave later as represented by the solid line in FIG. 13. Due to this shielding effect between Gd-155 and Gd-157, the curve of the neutron infinite multiplication factor is concave at the initial stage of the operation cycle particularly when H/U is large and the neutron spectrum is soft. This phenomenon is the second factor that causes the change of the axial power peaking with respect to the exposure.

These first and second factors occur in both fuel assemblies shown in FIGS. 2A and 3A of U.S. Pat. No. 4,587,090.

It has been found that, due to the first and second factors described above, the axial power peaking tends to be high at the initial stage of the operation cycle.

On the basis of the analysis described above, the present inventors of the present invention have reached the concept that the axial power peaking of the core at the initial stage of the operation cycle can be reduced and its change can be stabilized by mitigating the concavity of the neutron infinite multiplication factor curve for the fuel assembly of the first group or by making the curve convex particularly in the lower region of the fuel assembly.

As shown in FIG. 13, the period in which the change of the neutron absorption rate by Gd-155 is not monotonous is before the mid-point of the time during which gadolinia in the assembly is almost burned out. To adjust the neutron absorption during this initial period, burnable poison which is burnt out during this period must be used. It is effective to use a burnable poison having a neutron absorption cross section at least equal to that of gadolinia. For this reason, in at least one fuel rod in the lower region of the core there is a low concentration of gadolinia, and the concentration of the low concentration gadolinia is preferably smaller than ½ of the average gadolinia concentration at the lower region of other gadolinia-containing fuel rods.

Figure 14:
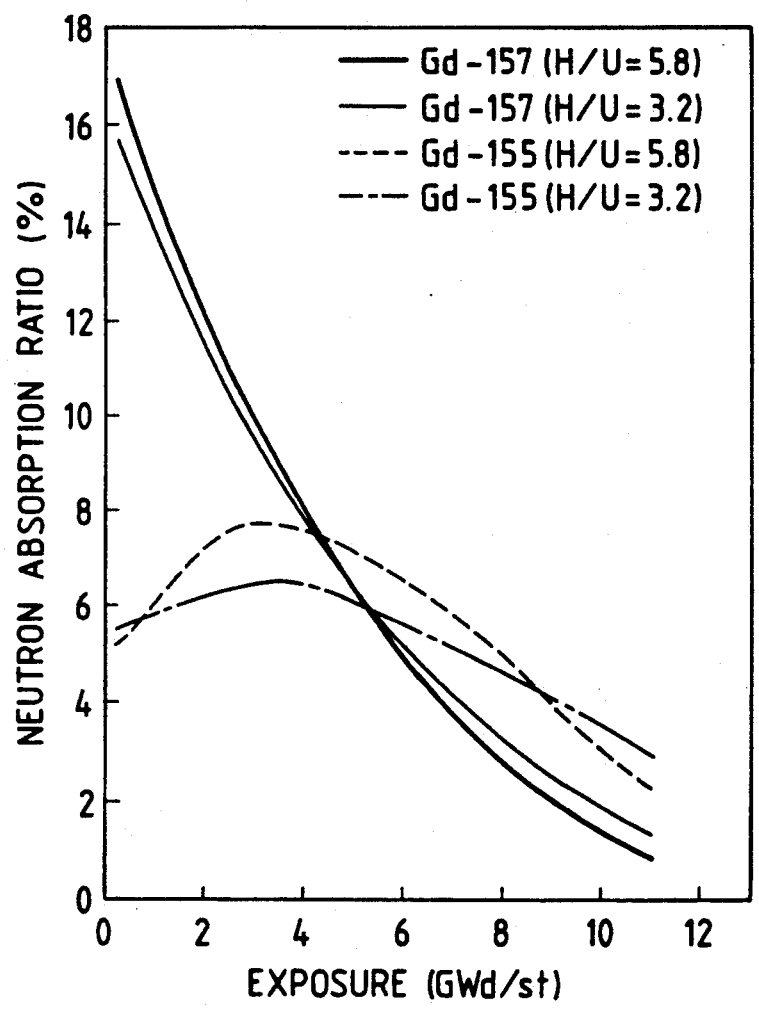

FIG. 14 shows the relation between the neutron absorption rate of gadolinia and the exposure taking H/U as a parameter. The greater the value of H/U and the softer the neutron spectrum, the greater becomes nonmonotony of the change of the neutron absoprtion rate for Gd-155 (i.e. the peak in FIG. 14 for Gd-155 is sharper). Therefore, the greater the value of H/U, the greater is the necessary degree of adjustment. At H/U of about 3, for example, no adjustment is necessary but at H/U of about 6, the neutron absorption rate at the initial stage of the operation cycle must be increased at least 2%. The greater the value H/U, the greater becomes the effect of adjustment achieved by the low concentration gadolinia. So the change of reaction rate in the upper and lower regions with respect to the exposure can be improved in a desired direction by use of fuel rods containing uniform low concentration gadolinia in the axial direction. When the number of gadolinia-containing fuel rods changes at different axial positions, the arrangement must be such that the number of the fuel rods containing the low concentration gadolinia does not become smaller in the region where effective H/U during operation is great.

In the fuel assembly shown in FIG. 1 of Japanese Laid-Open Patent Specification No. 149588/1988, the fuel rods containing gadolinia in a high concentration and the fuel rods containing gadolinia in a low concentration are disposed adjacent to one another in the rows and columns of the array of fuel rods parallel to the side surfaces of the lower tie plate. If two gadolinia-containing fuel rods are disposed adjacent to each other, mutual interference occurs and the neutron absorption rate drops. From the viewpoint of power peaking restriction, it is undesirable to locate the fuel rod containing low concentration gadolinia adjacent to other gadolinia-containing rods.

In consideration of above, the present inventors have found that the mitigation effect of concavity of the neutron infinite multiplication factor curve can be fully exhibited in a fresh fuel assembly (0 GWd/t) by not disposing fuel rods containing low concentration burnable poison (particularly those fuel rods which contain the low concentration burnable poison in the lower region) and fuel rods containing the high concentration burnable poison adjacent to one another in the fuel rod array. Instead these burnable poison-containing fuel rods are arranged in such a manner that fuel rods not containing burnable poison are interposed between them in the fuel rod array in the direction of the rows and columns. Consequently the rods containing burnable poison are adjacent to one another in the array only diagonally.

In other words, since the distance between the fuel rods containing the burnable poison in a low concentration and the fuel rods containing the burnable poison in a high concentration is greater, the interference effect described above can be reduced or avoided.

Hereinafter, specific embodiments of the present invention based on the studies described above will be explained.

Figure 3:
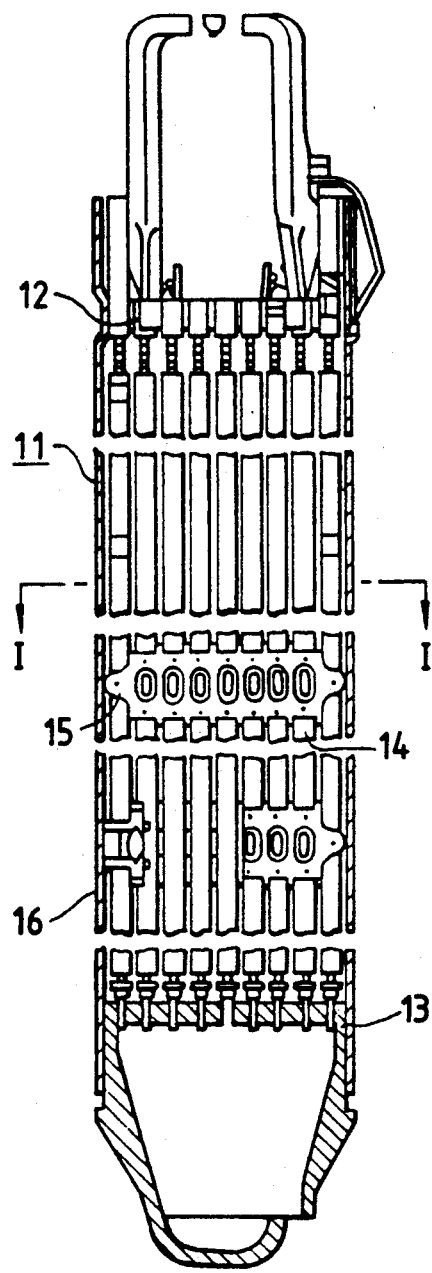
FIG. 3 is a longitudinal sectional view of the fuel assembly shown in FIG. 1.

A first fuel assembly embodying the present invention, which is applied to a boiling water reactor will be described with reference to FIGS. 1 to 3. The fuel assembly 11 of this embodiment includes an upper tie plate 12 having a handle, a lower tie plate 13, a plurality of fuel rods 14, a plurality of fuel spacers 15 and two water rods W. The upper end of each of the fuel rods 14 and water rods W is supported by the upper tie plate 12 and its lower end is supported by the lower tie plate. Each fuel rod 14 contains fuel pellets of uranium dioxide. The fuel spacers 15 support each fuel rod 14 in such a manner as to maintain a predetermined width of the gaps between the fuel rods 14. A channel box 16 is fitted to the upper tie plate 12 and encompasses the bundle of fuel rods bundled by the fuel spacers 15.

The fuel rods 14 are arranged in an 8-row by 8-column rectangular grid. In this rectangular grid arrangement of fuel rods, the lines of the fuel rods juxtaposed with one another in a certain direction (X—X direction in FIG. 1) are parallel with the side surface of the lower tie plate 13. The lines of fuel rods juxtaposed with one another in the direction orthogonal to this X—X direction (Y—Y direction shown in FIG. 1) are parallel with the other side surface of the lower tie plate 13. The cross-sectional shape of the lower tie plate at its portion for supporting the fuel rods is substantially equal to the shape defined by the inner surface of the channel box 16 and is rectangular. Two water rods W are disposed at the center of the cross-section of the fuel assembly and moreover, adjacent to each other on a diagonal line connecting an opposite pair of corners of the lower tie plate 13.

Seven kinds of fuel rods 6–10, G1 and G2 are used for the fuel rods 14. Their arrangement can be seen in FIG. 1. The distribution of fuel enrichment and gadolinia concentration of these fuel rods in the axial direction is shown in FIG. 2. Natural uranium is packed in a lower end region which is 1/24 of the fuel effective length portion of the rods and in an upper end region of 1/24 of the fuel effective length portion. In FIG. 2 the hatched region represents these natural uranium regions. The term "fuel effective length portion" means the region where the fuel pellets are packed or in other words, the region where the nuclear fuel material is packed. The fuel rods 6–10 do not contain gadolinia. The fuel rods G1 and G2 contain gadolinia. The mean gadolinia concentration of each fuel rod G2 is 1.0 wt % and is smaller than that (4.5 wt %) of each fuel rod G1. In the fuel rods 6–10, G1 and G2, the range of 1/24 to 23/24 of the full length of the fuel effective length portion from the lower end of the fuel effective length portion is the enriched uranium package area. In the fuel rods 6,8,9,10,G1 and G2, enrichment in the axial direction in the enriched uranium package area is uniform. Enrichment in their enriched uranium package areas is 3.9 wt % for the fuel rod 6, 3.4 wt % for the fuel rod 8, 2.9 wt % for the fuel rod 9, 2.0 wt % for the fuel rod 10, 3.4 wt % for the fuel rod G1 and 3.4 wt % for the fuel rod G2. Enrichment of the fuel rod 7 in its enriched uranium region is 2.9 wt % within the range 1/24–11/24 of the full length of the fuel effective length portion in the axial direction from its lower end and 3.9 wt % within the range of 11/24–23/24 the full length of the effective fuel length portion in the axial direction.

The gadolinia concentration distribution in the fuel rods G1 and G2 is uniform in the enriched uranium package areas as described above. The natural uranium package area does not contain gadolinia. The gadolinia is prepared from natural Gd. The gadolinia concentration of the two fuel rods G2 is the minimum concentration. The gadolinia concentration of the two fuel rods G2 is smaller than ½ of the mean gadolinia concentration of the other fuel rods G1 containing gadolinia. Enrichment and gadolinia concentrations described above are the values before the fuel assembly 11 is loaded into a core (at exposure of 0 GWd/t).

This embodiment uses seven fuel rods G1 and two fuel rods G2. The two fuel rods G2 are disposed at positions adjacent the water rods W forming therein saturated water areas. The seven fuel rods G1 are aligned in the second rows and columns from the outermost periphery but are not arranged adjacent to the water rods W and to the channel box 16. The channel box 16 defines cooling water paths inside the fuel assembly 11 and defines also water gaps (saturated water areas) between the fuel assemblies when they are loaded into the core. In other words, the fuel rods G1 are not disposed in the proximity of the saturated water areas formed when the fuel assemblies 11 are loaded into the core.

Figure 4:
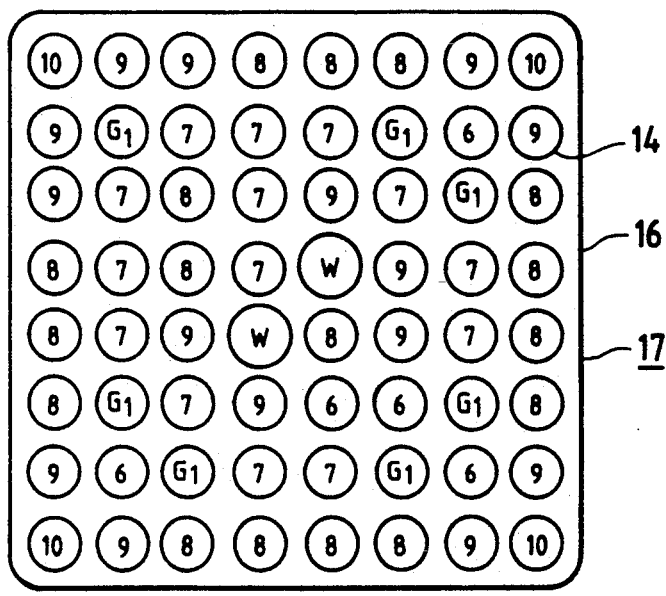
FIGS. 4 and 5 are diagrammatic transverse sectional views, similar to FIG. 1, of conventional fuel assemblies.
Figure 5:
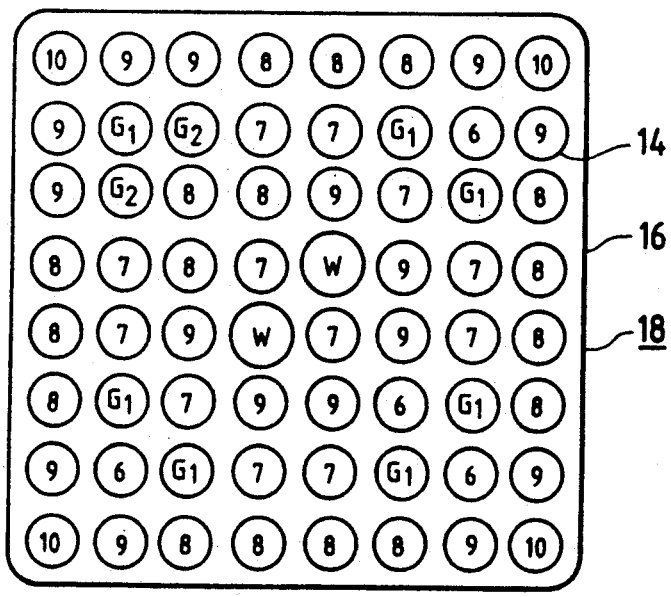

FIG. 4 shows a conventional fuel assembly 17 used for explaining the effect of the present invention. This fuel assembly 17 includes the aforementioned kinds of fuel rods 6–10 and G1. These fuel rods are disposed at the same positions as in the fuel assembly 11 of FIG. 1 except at the positions of the fuel rods G2 of the fuel assembly 11. Fuel rods 8 are disposed at the positions of the fuel rods G2. FIG. 5, too, shows another conventional fuel assembly used for explaining the effect of the present invention. This fuel assembly 18 applies the concept disclosed in Japanese Laid-Open Patent Specification No. 149588/1988 and uses all the fuel rods shown in FIG. 2. The fuel rods G1 and G2 are adjacent to one another in rows and columns of the array parallel to the side surfaces of the lower tie plate 13.

Figure 6:
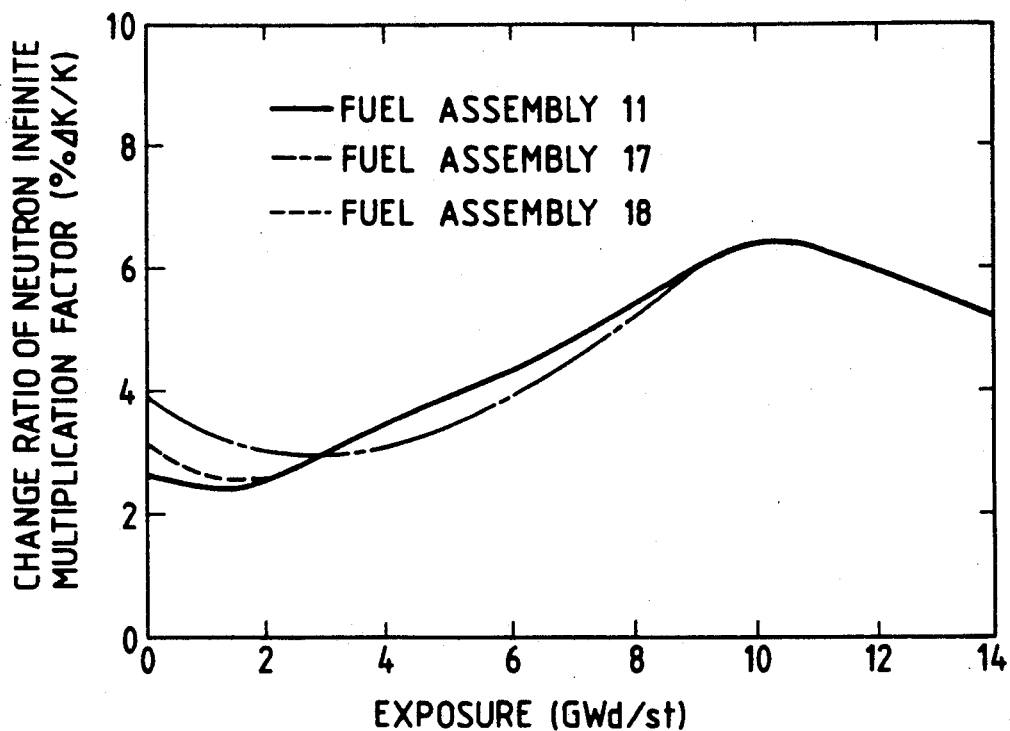
FIG. 6 is a graph showing the relation between the exposure and the change ratio of the neutron infinite multiplication factor from void fraction of 70% to 0% for the fuel assemblies shown in FIGS. 1,4 and 5.

FIG. 6 shows the relation between the neutron infinite multiplication factor and exposure in the operation cycle for the fuel assemblies 11, 17 and 18 starting in the fresh state (exposure 0 GWd/t). The characteristics are represented by the difference of the change ratios of the neutron infinite multiplication factor between when the void fraction is 0% and when it is 70%. In the boiling water reactor, the void fraction is from 0 to 20% in the lower region of the core and from 50 to 70% in its upper region. The neutron infinite multiplication factor of the upper region changes linearly as represented by dash line in FIG. 12. Therefore, the characteristics shown in FIG. 6 can be said as representing how much higher the neutron infinite multiplication factor is in the lower region of the core than in its upper region. When the characteristics change little and linearly, the axial power distribution of the core changes monotoneously and is relatively stable even when the exposure increases.

In the fuel assembly 17 of FIG. 4, the change ratio of the neutron infinite multiplication factor changes from 4.0% to 3.0% at the initial stage of the operation cycle (0 to 2 GWd/st). It changes from 3.2% to 2.5% in the fuel assembly 18 of FIG. 5. The fuel assembly 11 of FIG. 1 embodying the invention changes at 2.5% on an average with the maximum being 2.6% and minimum being 2.4%. In comparison with the fuel assemblies 17 and 18, the fuel assembly 11 of this embodiment can more stabilize the power distribution in the axial direction at the initial stage of the operation cycle than the fuel assemblies 17 and 18. The small value of the change ratio of the neutron infinite multiplication factor means that the difference of the neutron infinite multiplication factors is small between the lower region and the upper region or, in other words, axial power peaking is small. Accordingly, the axial power peaking at the initial stage of the operation cycle is greatly reduced in the fuel assembly 11 compared with the fuel assemblies 17 and 18.

The reason for this small improvement of the fuel assembly 11 of FIG. 1 over the fuel assembly 18 having the same fuel rods G1 and G2 will be explained. Immediately after the start of the operation of a certain operation cycle (near 0 GWd/st), the degree of improvement of the fuel assembly 18 over the fuel assembly 17 is about 3/5 of that of the fuel assembly 11 over the fuel assembly 17. This is because the change of the thermal neutron flux due to the void fraction is small at the positions of the fuel rods G2 adjacent to the fuel rods G1 having a higher gadolinia concentration as described already. In order to restrict the reaction rate at the low void fraction by the fuel rods G2, therefore, it is preferred to position fuel rods not containing the burnable poison between the fuel rods G1 and the fuel rod G2 as they are in this embodiment. In this embodiment, the tendency that the neutron infinite multiplication factor is the same in the upper and lower regions is stronger than in the fuel assembly 18 and the effect of mitigating the degree of concavity of the neutron infinite multiplication factor curve for the lower region becomes greater than in the fuel assembly 18. In other words, since the function of gadolinia of the fuel rods G2 can be exhibited fully, the degree of concavity that occurs at the initial stage of the operation cycle due to the characteristics of the neutron absorption ratio of Gd-155 in the fuel rod G1 can be sufficiently compensated for.

Figure 7:
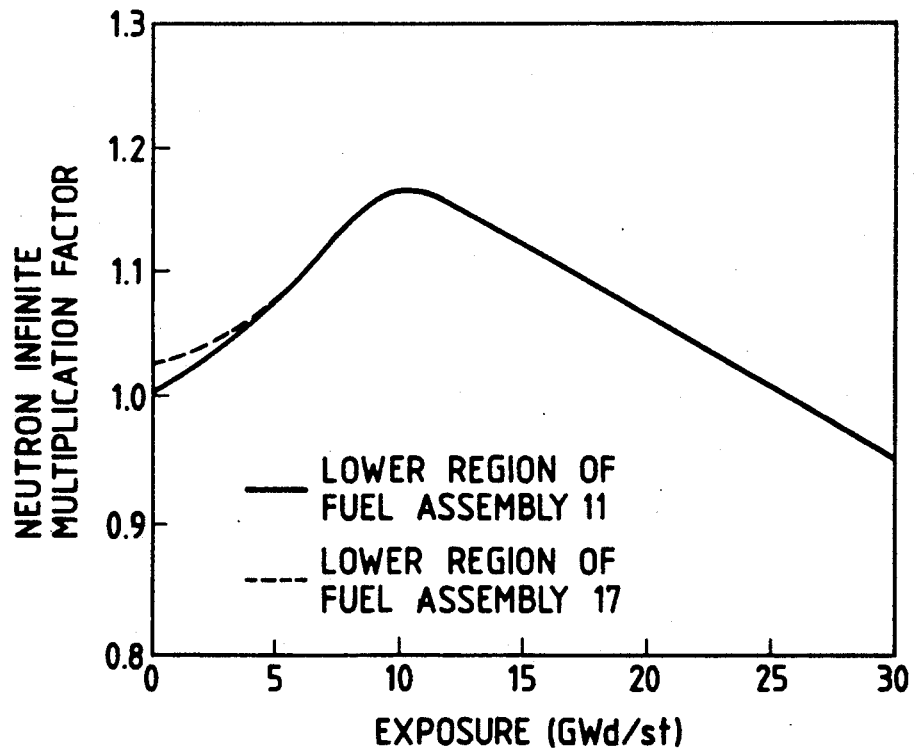
FIG. 7 is a graph showing the relation between the exposure and the neutron infinite multiplication factor for the fuel assemblies shown in FIGS. 1 and 4.

FIG. 7 shows the change of the neutron infinite multiplication factor when the lower regions of the fuel assemblies 11 and 17 of FIGS. 1 and 4 are burnt up at the void fraction 0%. The fuel assemblies 11 and 17 have lower mean enrichment and softer neutron spectra than the fuel assembly 20 of FIG. 15 to be described later. Therefore, the shielding effect of the thermal neutrons by gadolinia itself which is a strong neutron absorber is great and the tendency that the reaction rate of gadolinia is restricted at the initial stage of the operation cycle is remarkable. The fuel assembly 11 of this invention provides a neutron infinite multiplication factor curve which changes substantially linearly to the exposure as represented by the solid 1 line in FIG. 7 by compensating for the reduction of the absorption rate by using the fuel rods G2. The characteristics of the fuel assembly 18 of FIG. 5 are not shown in FIG. 7; at the initial stage of the operation cycle, however, its characteristics shift to a mid-level between that of the fuel assembly 17 and that of the fuel assembly 11.

Figure 8:
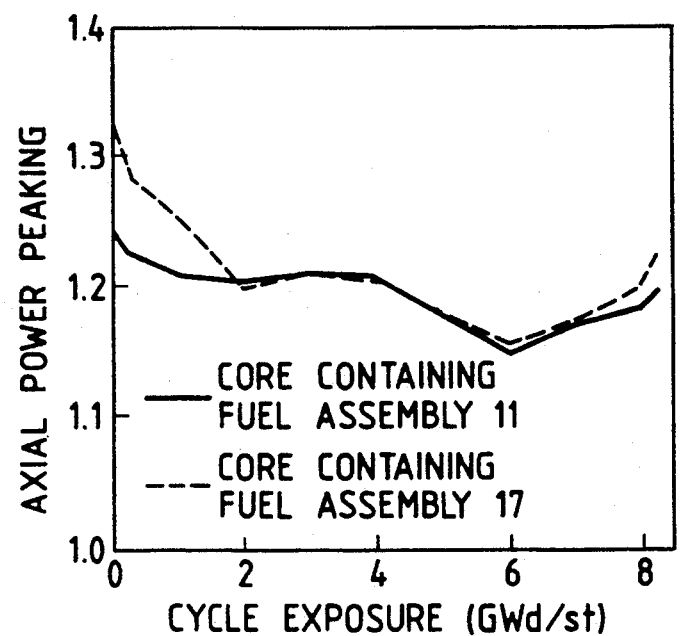
FIG. 8 is a graph showing the relation between the exposure and the axial power peaking in the operation cycle for the core of fuel assemblies shown in FIGS. 1 and 4.

FIG. 8 shows the change of the average axial power peaking of the core into which the fuel assembly 11 of FIG. 1 is loaded. For comparison, the drawing shows also the characteristics of the core into which the fuel assembly 17 of FIG. 4 is loaded. Each of these cores consists of 764 fuel assemblies, of which 212 are replaced by fresh fuel assemblies whenever one operation cycle is carried out. The control rod insertion pattern is constant from the initial stage of the operation cycle to the core average exposure of 5 GWd/st in the cycle and the operation conditions such as the re-circulating flow rate are the same for both cores in order to compare the burn-up characteristics.

In the core into which the fresh fuel assembly 17 is loaded, the reaction rate of the lower region of the fresh fuel assembly 17 is considerably higher than that of the upper region at the initial stage of the operation cycle. Therefore, power peaking in the lower region of the core is extremely high. In contrast, when the fresh fuel assembly 11 of this invention is used, the reaction rate at the initial stage of the operation cycle is restricted by the rods of low concentration gadolinia of 1.0 wt %, and this effect is particularly strong in the lower region of the core having a low void fraction. Accordingly, the difference of the reaction rates between the upper and lower regions is relatively small. For this reason, the axial power peaking of the lower region of the core at the initial stage of the operation cycle is smaller by about 5% and the change of the axial power distribution with burn-up is smaller. The axial power peaking of the core to which the fuel assembly 18 is loaded at the initial stage of the operation cycle is greater than that of the fuel assembly 11.

The fuel assembly 11 has a smaller number of fuel rods than that of the fuel assembly 20 described later. Therefore, the permissible level of axial power peaking is smaller, at the same linear heat generation rate limit. Even after 1.0 wt % of gadolinia is burnt up, therefore, the number of the high concentration gadolinia-containing fuel rods (G1) that remain is the same in the upper and lower regions. The axial power peaking is about 1.2 throughout the operation cycle. Since low concentration gadolinia is also added to the upper region, in the fuel assembly 11 there can be obtained the effect that the reactor shut down margin at the initial stage of the operation cycle is improved by about 0.5% ΔK in comparison with the reactor to which the fuel assembly 17 is loaded.

Since the fuel rods G2 having the low gadolinia concentration are arranged adjacent to the water rods W, high absorption value is obtained and the axial power peaking is effectively reduced.

The fuel assembly 20 of another embodiment of the present invention will be explained with reference to FIGS. 15 and 16. The fuel assembly 20 also has the structure shown in FIG. 3. Unlike the fuel assembly 11 of FIG. 1, the fuel assembly 20 is equipped with eight kinds of fuel rods 14 shown in FIG. 16. The fuel rods 14 are fuel rods 1–5 and G3–G5. These fuel rods are arranged in a 9-row by 9-column rectangular grid arrangement. In the fuel rods 1, 3–5 and G3–G5, natural uranium is loaded within the lowermost 1/24 and the uppermost 2/24 of the fuel effective length portion. In the fuel rods 1, 3–5 and G3–G5, the portion between the natural uranium package areas of the upper and lower end portions is the enriched uranium package area. Enrichment of the enriched uranium package area in each of the fuel rods 1, 4, 5 and G3, G4 G5 is 4.8 wt %, 3.6 wt %, 2.8 wt %, 3.7 wt %, 3.7 wt % and 3.7 wt % respectively, and is uniform in the axial direction.

In the fuel rod 3, the enriched uranium package area is divided into upper and lower regions at the point 11/24 of the fuel effective length portion from the lower end, and enrichment is 4.8 wt % in the upper region and 4.1 wt % in the lower region. The fuel rods G3–G5 contain gadolinia in their enriched uranium package area. The fuel rod G4 contains 4.5 wt % of gadolinia throughout its entire enriched uranium package area. In the fuel rods G3 and G5, the enriched uranium package area is divided into upper and lower regions at the same position as the fuel rod 3. The fuel rod G3 contains 4.0 wt % of gadolinia in its upper region and 5.0 wt % of gadolinia in its lower region. The fuel rod G5 contains 4.0 wt % of gadolinia in its upper region and 2.0 wt % of gadolinia in its lower region. The upper end of the fuel effective length portion of the fuel rod 2 is at the point 15/24 of the fuel effective length from the lower end thereof. The length of the fuel rod 2 in the axial direction is smaller than those of the other fuel rods. All the fuel rods 2 which have uniformly 4.8 wt % of enrichment are located in a second column or row from the outermost periphery. The gadolinia described above is prepared from natural Gd containing almost equal amounts of Gd-155 and Gd-157. The enrichment distribution and the gadolinia concentration distribution shown in FIG. 16 represent those of a fresh fuel assembly 20 having an exposure of 0 GWd/t. Two water rods W1 are arranged at the centre of the cross-section of the fuel assembly and are, adjacent to each other on a diagonal line connecting a pair of opposite corners of the lower tie plate 13. The outer diameter of each water rod W1 is greater than the fuel rod pitch. The two water rods W1 together occupy the area where seven fuel rods 14 could be disposed at their standard pitch. In other words, seven fuel rods 14 are excluded by the disposition of the two water rods W1. A fuel assembly having such an arrangement of water rods is shown in FIGS. 1, 7 and 8 of Japanese Laid-Open Patent Specification No. 217186/1987.

In the fuel assembly 20, the gadolinia content can be expressed as 4.0 wt % × 15 rods = 60 in the upper region and (5.0 wt % × 8) + (4.0 wt % × 3) + (2 wt % × 4) = 60 in the lower region. Thus the average gadolinia content per rod containing gadolinia is the same in the upper and lower regions. The fuel rods G3–G5 are divided into upper and lower regions, and the maximum gadolinia concentration (5.0 wt %) and minimum gadolinia concentration (2.0 wt %) in the gadolinia-containing fuel rods are both in the lower region. In the lower region of the fuel assembly 20, the average gadolinia concentration of the fuel rods G3 and G4, i.e. excluding the fuel rod G5 having the minimum gadolinia concentration, is 4.7 wt %. The gadolinia concentration of the lower region of the fuel rod G5 (the minimum gadolinia concentration) is thus less than ½ of the average gadolinia concentration of the rods G3 and G4 described above. The maximum and minimum gadolinia concentrations described above are not present in the enriched uranium package area in the upper region of the fuel assembly 20. The fuel rods G5 containing the minimum concentration of gadolinia are disposed adjacent to the water rods W1 to maximize the gadolinia value. To reduce the maximum linear heat generation rate, the mean enrichment in the lower region of the fuel assembly is smaller by 0.2 wt % than that of the upper region in this embodiment.

Figure 15:
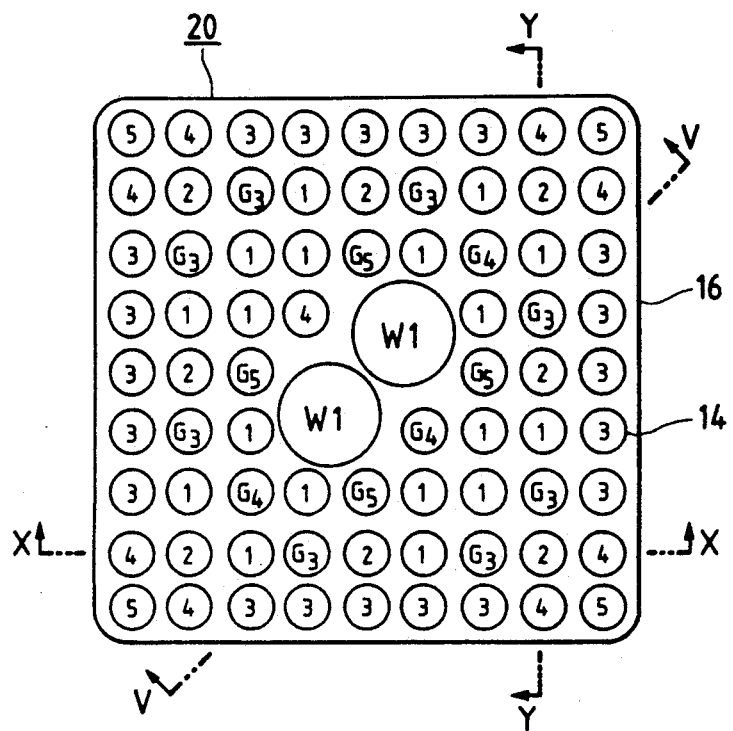
FIG. 15 is a diagrammatic cross-sectional view similar to FIG. 1 showing a second fuel assembly embodying the present invention.
Figure 16:
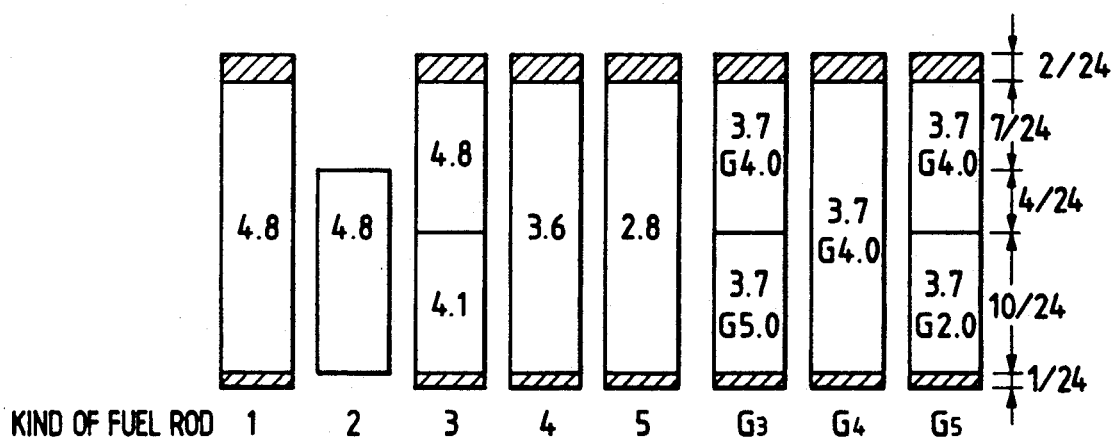
FIG. 16 is a diagram showing enrichment and gadolinia concentration distribution of each fuel rod shown in FIG. 15.
Figure 17:
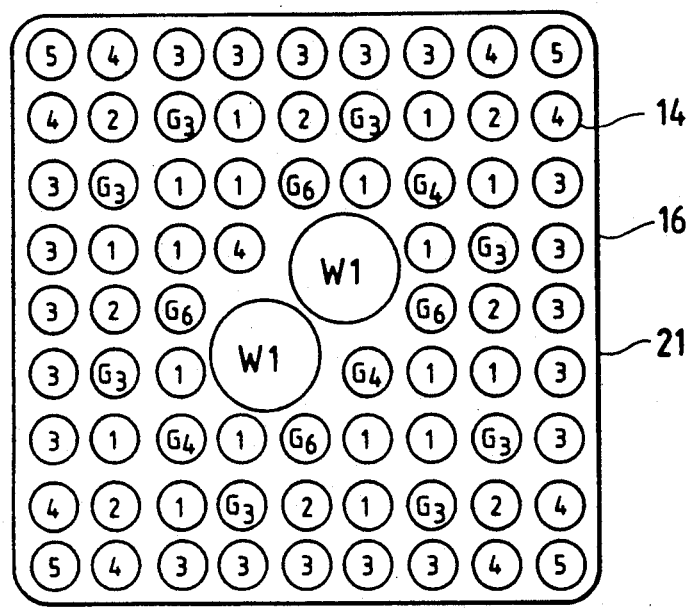
FIG. 17 is a transverse sectional view of a fuel assembly which is not an embodiment of the invention but which is conceived to explain the effect of the fuel assembly shown in FIG. 15.
Figure 18:
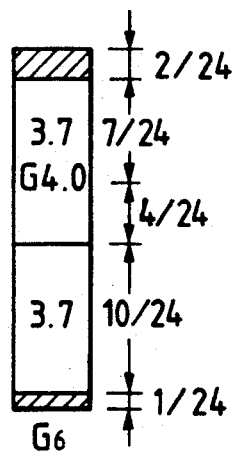
FIG. 18 is a diagram showing enrichment and gadolinia concentration distribution of a fuel rod type used in the fuel assembly shown in FIG. 17.

FIG. 17 shows a fuel assembly 21 conceived for the purpose of explaining the effect of the embodiment of FIG. 15. The fuel assembly 21 of FIG. 17 is one to which the concept shown in FIG. 10 is applied. This fuel assembly 21 includes the fuel rods 1–5, G3 and G4. The arrangement of these fuel rods is the same as that of the fuel assembly 20. The fuel assembly 21 uses the fuel rods G6 in place of the fuel rod G5. In the fuel rod G6, the gadolinia concentration in the lower region is 0 wt % as shown in FIG. 18.

Figure 19:
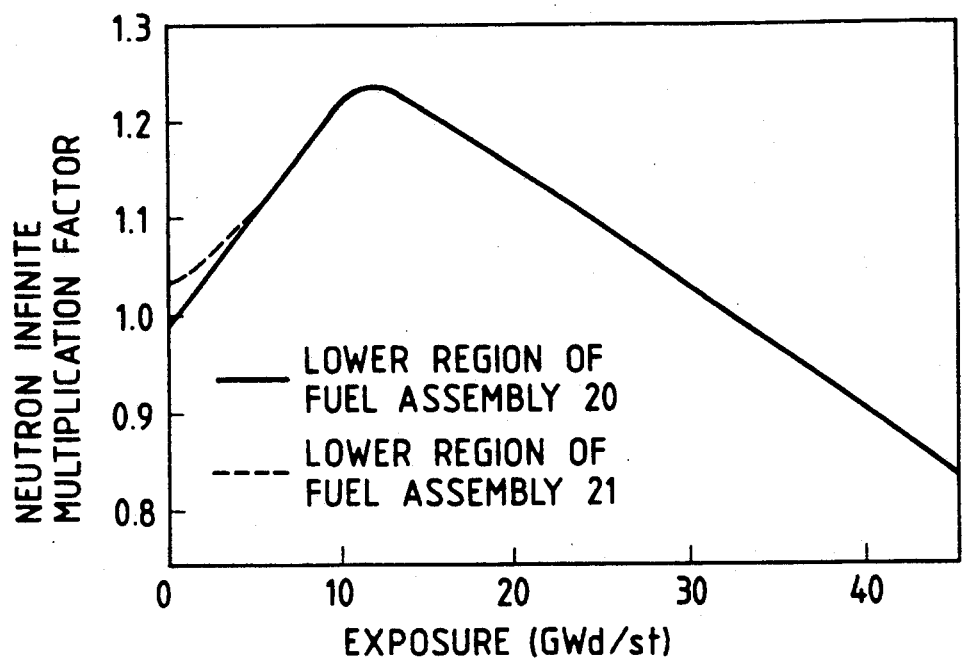
FIG. 19 is a graph showing the change of the neutron infinite multiplication factor with exposure for the fuel assemblies shown in FIG. 15 and 17.

FIG. 19 shows comparatively the changes of the neutron infinite multiplication factors when the lower region of the fuel assembly 20 of FIG. 15 and that of the fuel assembly 21 of FIG. 17 are burnt at the void fraction of 0%, respectively.

Since the neutron absorption by gadolinia is not sufficiently strong at the initial stage of the operation cycle in the lower region of the fuel assembly 21, the neutron infinite multiplication factor shows a concave curve. In contrast, in the lower region of the fuel assembly 20 of FIG. 15, since low concentration gadolinia is present (the fuel rods G5 is used), the neutron infinite multiplication factor rises almost linearly with respect to exposure at the initial stage of the operation cycle.

Figure 20:
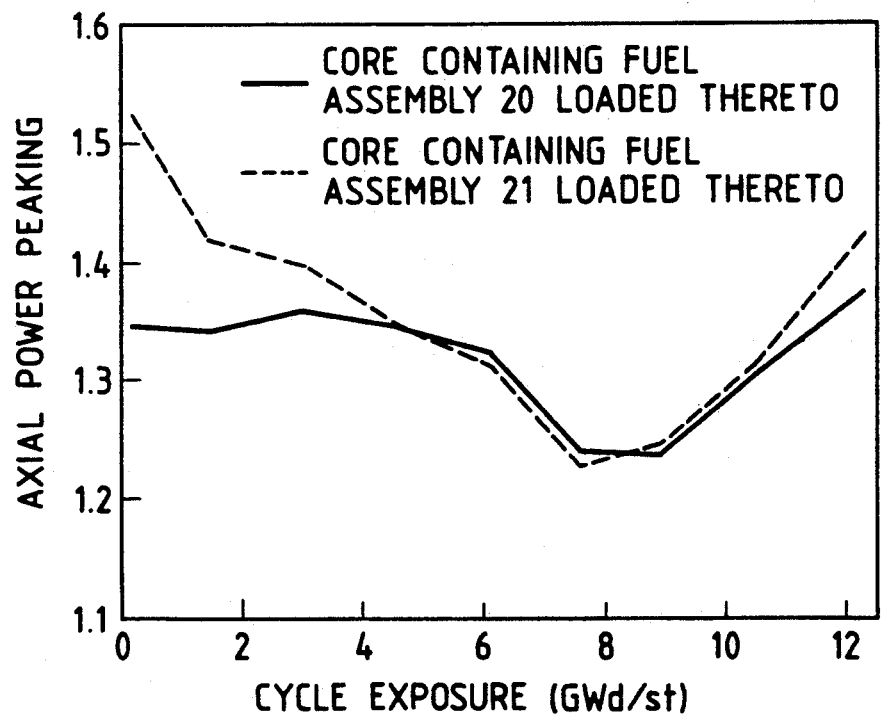
FIG. 20 is a graph showing the axial power peaking for the fuel assemblies in FIGS. 15 and 17.

FIG. 20 shows the axial power peaking in the core to which the fuel assembly 20 is loaded. For comparison, the characteristics of the core to which the fuel assembly 21 is loaded are also shown. The core consists of 764 fuel assemblies and 228 of them are replaced by fresh ones for each operation cycle. To eliminate the influences of the control rod insertion pattern and the re-circulating flow rate on the power distribution, the characteristics are compared with each other under the same operational conditions.

In the core in which the fuel assembly 21 is loaded, since the reaction rate is high in the lower region of the fresh fuel assembly 21 at the initial stage of the operation, the power peaking of the lower region becomes extremely high in the same way as in the fuel assembly 17. In the fuel assembly 21, the number of the gadolinia-containing fuel rods is smaller in the lower region than in the upper region. Since the power in the lower region is great in the first half of the operation cycle in the core in which this fuel assembly 21 is loaded, the core average void fraction is high and the power of the lower region of the core becomes smaller at the final stage of the operation cycle so that the core average void fraction becomes low. Fuel economy can be improved by such an operation. To further improve this effect, the number of the gadolinia-containing fuel rods in the lower region of the fuel assembly is reduced, so that the axial power peaking at the very early stage of the operation cycle becomes extremely high as shown in FIG. 20. This causes an increase in the linear heat generation rate of the fuel rods and cannot be permitted from the viewpoint of integrity of the fuel.

In the core to which the fuel assembly 20 of this embodiment is loaded, the reaction rate in the lower region of the fresh fuel assembly 20 is low at the initial stage of the operation cycle and hence, a high axial power peaking does not occur in the lower region of the core, as represented by solid line in FIG. 20. Furthermore, since the neutron infinite multiplication factor in the lower region of the fresh fuel assembly 20 changes almost linearly with respect to the exposure as shown in FIG. 19, the ratio of the reactivity between the upper and lower regions can be kept constant in the first half of the operation cycle. Accordingly, the change of the axial power peaking in the first half of the operation cycle is stable.

The reason why axial power peaking can be kept stable at the lower region where the linear rise of the neutron infinite multiplication factor can be accomplished in the early stage of the operation cycle is because the fuel rods G5 having the lowest gadolinia concentration exist and they are not located adjacent to the fuel rods G3 or G4 having a higher gadolinia concentration in the rows or columns of the fuel rod array. The fuel rods G5 are adjacent the fuel rods G3 or G4 in the diagonal directions of the array (V—V direction). The distance between the fuel rods that are adjacent to one another in the V—V direction is greater than the distance between the fuel rods adjacent to one another in the X—X or Y—Y direction, i.e. the pitch of the fuel rods disposed in the rectangular grid form. Therefore, the fuel rods G5 are not affected by the fuel rods G3 or G4 and can reduce reactivity at a low void fraction state.

This embodiment can reduce more greatly the axial power peaking at the initial stage of the operation cycle than when the fuel rods G5 are disposed adjacent to the fuel rods G3 or G4 in the X—X direction (or in the Y—Y direction) by applying the concept of Japanese Laid-Open Patent Specification No. 149588/1988 to the fuel assembly 20, and can reduce its variation as well. After the gadolinia (2.0 wt %) is rapidly burnt up in the lower region of the fuel rods G5, the number of gadolinia-containing fuel rods is effectively 15 in the upper region and 11 in the lower region so that the reactivity ratio between the upper and lower regions becomes analogous to that of the fuel assembly 21. In other words, the axial power peaking and the core average void fraction can be kept high from this point of time. At the final stage the axial power peaking increases in the upper region of the core and the core average void fraction decreases. When the fuel assembly 20 is used as described above, the effect of a spectral shift can be obtained, as with the fuel assembly 21. In the core in which the fuel assembly 21 is loaded, the maximum linear heat generation rate during the operation cycle reaches 14 kw/ft, whereas it can be limited to about 12 kw/ft in the core to which the fuel assembly 20 of this embodiment is loaded.

In the core in which the fuel assembly 20 is loaded, the spectral shift effect is smaller than that of the core in which the fuel assembly 21 is loaded. For this reason, fuel economy is slightly lower. Under this thermal limitation, however, the embodiment realizes maximum fuel economy by the optimum control of the axial power distribution, as shown in FIG. 20.

The natural uranium regions disposed at the upper and lower end portions of each fuel rod have the effect of reducing the neutron leakage and improve fuel economy.

In this embodiment the fuel rods 14 are arranged in a ring from the outer periphery of the fuel assembly to its third layer inwards in such a manner as to encompass the two water rods W1. The two water rods W1 are disposed at the centre of the cross-section of the fuel assembly and in a centre region where the fuel rods 14 would be arranged in a 3-row by 3-column matrix. The thickness of the two water rods W1 is such that they can be disposed in the centre region described above. Accordingly, though the two water rods W1 are present, two fuel rods 14 can be disposed in this centre region one on each side of the water rods W1 and in the direction which is at right angles to the line connecting the centres of the two water rods W1. Therefore, the number of fuel rods 14 excluded by the water rods is seven as described already, and the fuel inventory that can be loaded can be increased by one fuel rod. Since the two water rods W1 are disposed at the centre of the fuel assembly 20, it is possible to moderate well the nuclear fission neutrons occurring at the centre of the fuel assembly 20, to increase the thermal neutron flux at the centre of the fuel assembly 20 and to make flat the thermal neutron flux distribution inside the fuel assembly 20. The arrangement of the fuel rods 14 in the fuel assembly 20 and that of the water rods W1 do not much deviate from the arrangement of symmetry of rotation with respect to the centre of the fuel assembly 20. Therefore, the fuel rods 14 having equal enrichment can be disposed at positions which are substantially the positions of symmetry of rotation.

Furthermore, since fuel rods 2 having a small length in the axial direction are used, the pressure loss drops at the upper end portion of the fuel assembly and the reactor shut down margin can further be improved.

Furthermore, this embodiment can obtain the effects brought forth by the embodiment described in the paragraphs from page 20, line 10 to page 32, line 4 and in FIGS. 1 and 2 of U.S. Pat. No. 5,008,070. In comparison with the embodiment of this U.S. Pat. No. 5,008,070, the fuel assembly 20 of the present embodiment can reduce the axial power peaking at the initial stage of the operation cycle. The fuel assembly disclosed in FIGS. 3A and 3B of U.S. Pat. No. 4,587,090 brings the problems described on page 27, line 12 to page 28, line 15 of this specification. The use of the fuel assembly 20 eliminates such problems.

In this embodiment, it is possible to change the arrangement of the fuel rods G3, G4 and G5 and to dispose the fuel rods G5 and G3 or G4 in such a manner as to interpose those fuel rods which do not contain gadolinia between them. In the fuel assembly 10, the fuel rods G1 and G2 may be disposed inside the fuel rod arrangement in the V—V direction.

Figure 21:
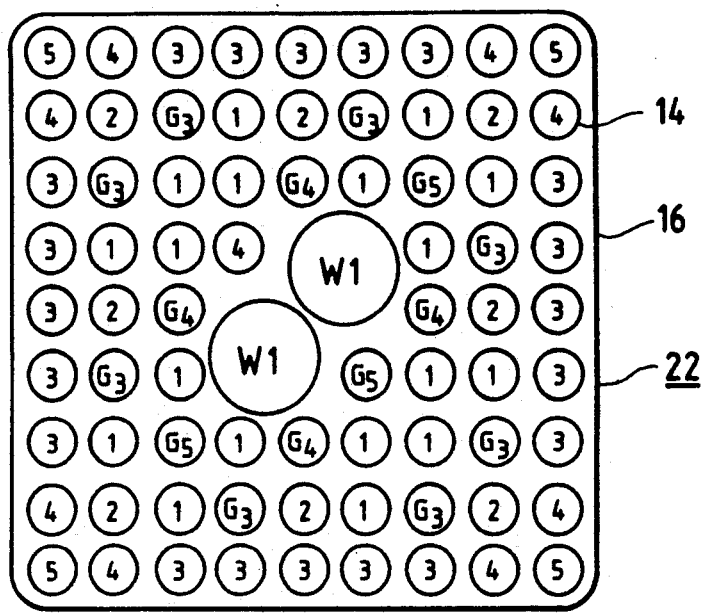
FIG. 21 is a diagrammatic cross-sectional view of a third fuel assembly embodying the present invention.

The fuel assembly of still another embodiment of the present invention will be explained with reference to FIG. 21. The fuel assembly 22 in this embodiment includes the same fuel rods 1-5 and G3-G5 as the fuel assembly 20. The difference of this fuel assembly 22 from the fuel assembly 20 resides in that one fuel rod G5 is omitted and one extra fuel rod G4 is included instead. Therefore, the gadolinia content, expressed in the manner given above, in the upper region of the fuel assembly 22 is 60 and it is 62 in the lower region.

The minimum gadolinia concentration in this embodiment is 2.0 wt % in the lower region of the fuel rods G5. This value is smaller than ½ of the mean gadolinia concentration of the fuel rods G3 and G4 in the lower region of the fuel assembly 20. The fuel rods G5 are adjacent to the fuel rods G3 or G4 only in the V—V direction.

The fuel assembly 22 of this embodiment provides the same effect as that of the fuel assembly 20. However, the spectral shift effect is somewhat reduced in this embodiment in comparison with the fuel assembly 20 of FIG. 15 because the gadolinia content of the lower region is somewhat greater than that of the upper region. At the point of time when 2.0 wt % of gadolinia is burnt up, the number of gadolinia-containing fuel rods is 15 in the upper region and 12 in the lower region. The difference of the number of gadolinia-containing fuel rods between the upper and lower regions in this embodiment is smaller than that of the fuel assembly 20. Therefore, in the intermediate stage of the operation cycle where gadolinia at the portion having the minimum gadolinia concentration is burnt up, the reactivity in the lower region is less than that of the fuel assembly 20. This means that the axial power peaking of the core to which the fuel assembly 22 is loaded becomes smaller than that of the core to which the fuel assembly 20 is loaded.

The fuel assembly of another embodiment of the present invention will be explained with reference to FIG. 22. The fuel assembly 23 of this embodiment includes the fuel rods 1-5, G3, G4 and G6 described above and also fuel rods G7. The fuel rod G7 is produced by changing the gadolinia concentration in the lower region of the fuel rod G5 from 2.0 wt % to 1.0 wt %. The minimum gadolinia concentration in this embodiment is 1.0 wt % in the lower region of the fuel rod G7. This value is smaller than the mean gadolinia concentration of the fuel rods G3, G4 and G6 in the lower region of the fuel assembly 23. The fuel rods G7 are adjacent to the fuel rods G3, G4 and G6 only in the V—V direction. The gadolinia content, expressed as above, in the upper region of the fuel assembly 23 is 68 and is lower than the value 58 of the gadolinia content in the lower region.

Figure 22:
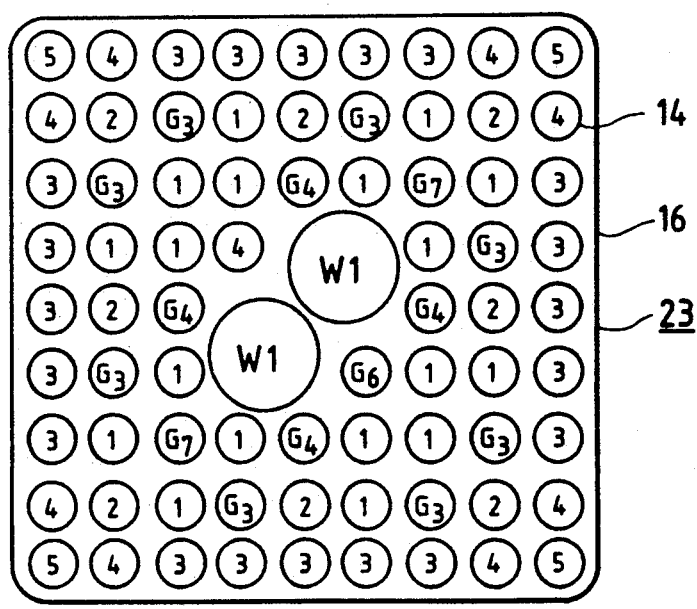
FIG. 22 is a diagrammatic cross-sectional view of a fourth fuel assembly embodying the present invention.

The fuel assembly 23 of FIG. 22 can provide the same effect as the fuel assembly 20.

The number of the gadolinia-containing fuel rods is 15 in the upper region and 14 in the lower region. Therefore, the reaction rate in the lower region at the initial stage of the operation cycle is greater than that of the fuel assembly 20. In the core to which the fuel assembly 23 of this embodiment is loaded, therefore, the axial power peaking in the lower region of the core at the initial stage of the operation cycle becomes greater than that of the core to which the fuel assembly 20 is loaded. For this reason, the spectral shift effect by the axial power shape control becomes greater and fuel economy becomes higher, too.

In summary, the present invention can reduce the axial power peaking at the initial stage of the operation cycle and can restrict the change of the power peaking.

What is claimed is:

1. A nuclear fuel assembly having upper and lower regions and an array of fuel rods extending through both said regions, said fuel rods comprising a plurality of first fuel rods each containing nuclear fuel material but not containing burnable poison and a plurality of further fuel rods each containing both nuclear fuel material and burnable poison, said further fuel rods comprising at least one second fuel rod and at least one third fuel rods, wherein said at least one second fuel rod has at a lower region of the fuel assembly a burnable poison concentration which is a lowest burnable poison concentration other than zero of said burnable poison concentration contained in said further fuel rods at said lower region of the fuel assembly, and said at least one third fuel rod has at said lower region of the fuel assembly a burnable poison concentration higher than said lowest burnable poison concentration of said at least one second fuel rod, and wherein as seen in plan view said first fuel rods are disposed nearer to said second and third fuel rods than said second and third fuel rods are disposed with respect to one another in said array, and the burnable poison concentration of said second and third fuel rods of said further fuel rods at the lower region of the fuel assembly is determined at the same horizontal section extending through said further fuel rods in said lower region of the fuel assembly average burnable poison concentration of said further fuel rods is equal or higher in said lower region than in said upper region.

2. A nuclear fuel assembly according to claim 1 having a plurality of said second fuel rods.

3. A nuclear fuel assembly according to claim 1 wherein said lowest burnable poison concentration is less than half of an average burnable poison concentration of said further fuel rods in said lower region.

4. A nuclear fuel assembly according to claim 1 wherein having a plurality of said third fuel rods and at least one of said third fuel rods has at said lower region of the fuel assembly a burnable poison concentration which is a highest burnable poison concentration in said further fuel rods.

5. A nuclear fuel assembly according to claim 1 further having water rods and wherein said at least one second fuel rod is adjacent said water rods.

6. A nuclear fuel assembly according to claim 1 wherein said array of fuel rods as seen in plan view is a rectangular array having rows and columns at right angles, and each said further fuel rod has said first fuel rods as adjacent fuel rods in the row direction and the column direction.

7. A nuclear fuel assembly according to claim 6 wherein a lower tie plate supports lower ends of said fuel rods, said rows and columns of said array being parallel to respective side edges of said lower tie plate.

8. A nuclear fuel assembly according to claim 1 wherein said lowest burnable poison concentration in said lower region of the assembly is lower than the burnable poison concentration in any of said further fuel rods at said upper region of the assembly.

9. A nuclear fuel assembly according to claim 1 wherein said burnable poison is Gd and said minimum burnable poison concentration is in the range 1 to 2% by weight (calculated as $Gd_2O_3$) of the fuel content of the rod at the lower region.

10. A reactor core having at least one fuel assembly according to claim 1.

11. A nuclear fuel assembly having a plurality of first fuel rods each containing nuclear fuel material but not containing burnable poison and a plurality of further fuel rods each containing both nuclear fuel material and burnable poison, said further fuel rods comprising (a) at least one second fuel rod having at a lower region of the fuel assembly a burnable poison concentration which is a lower burnable poison concentration other than zero in said further fuel rods, (b) a plurality of third fuel rods having at said lower region of the fuel assembly a burnable poison concentration higher than said lowest burnable poison concentration, the fuel rods being arranged so that said first fuel rods are adjacent fuel rods of each of said further fuel rods, and wherein the burnable poison concentration of said second and third fuel rods of said further fuel rods at said lower region of said fuel assembly is determined at the same horizontal section extending through said further fuel rods in said lower region of the fuel assembly the average burnable poison concentration of said further fuel rods is equal or higher in said lower region than in said upper region.

* * * * *